UNITED STATES PATENT OFFICE.

WILHELM KLAPPROTH, OF NIEDER-INGELHEIM-ON-THE-RHINE, GERMANY.

PROCESS OF MANUFACTURING LACTIC ACID.

947,078. Specification of Letters Patent. Patented Jan. 18, 1910.

No Drawing. Application filed April 1, 1909. Serial No. 487,251.

*To all whom it may concern:*

Be it known that I, WILHELM KLAPPROTH, a subject of the Emperor of Germany, residing at Nieder-Ingelheim-on-the-Rhine, Germany, have invented certain new and useful Improvements in a Process of Manufacturing Lactic Acid from Lactate of Lime, of which the following is a specification.

According to the method hitherto employed for obtaining lactic acid from lactate of lime sulfuric acid is added direct to the dilute solution of this salt such as results from the fermentation process, and the lactic acid obtained by filtration, having a strength of about 10 per cent., is further concentrated by evaporation and purified. This method has the disadvantage that an acid solution has to be dealt with, thus causing great difficulties with regard to the apparatus. Besides, in evaporating solutions containing free lactic acid considerable quantities of the latter are lost. It has been attempted, in practice, to overcome these difficulties by concentrating the solutions before decomposition, so that the solutions which are boiled down contain chiefly lactate of lime. But this method has another drawback, in that it is difficult to work up such concentrated solutions of calcium lactate. As soon as, for instance, the concentration has reached a certain degree, a stiff, almost solid paste of sulfate of lime is formed on the addition of sulfuric acid, not admitting of any further working up. The inventor has found by careful experiments that these difficulties may be overcome by effecting the decomposition of the solutions containing lactate of lime in the presence of concentrated lactic acid, said solutions being previously concentrated, if necessary, as before. It has been found, that, according to the quantity of concentrated acid present a more or less thin, not a firm, solid magma is obtained which may be filtered without difficulty. In this manner lactic acid may be obtained direct in a salable degree of concentration.

As, according to this new process, not an acid but a neutral solution has to be boiled down, it is self-evident that there is no difficulty as to apparatus and that the losses inherent in the evaporation of free lactic acid are avoided. It has further been found that in this way an acid more free from anhydrid is obtained than with the old process of evaporating dilute acid. This is all the more surprising as in reality any expert would perhaps expect that the addition of concentrated sulfuric acid to the hot liquid would cause an increased formation of anhydrid, *i. e.* a combining of two molecules of lactic acid by elimination of water.

The concentrated lactic acid may either be added to the concentrated calcium lactate solutions before decomposition or it may be added to the acid used for decomposition of the said salt. The solution of lactate of lime may also be evaporated to dryness and stirred, in the powdered form, first with lactic acid preferably heated to about 50° C. and then with a suitable acid such as sulfuric, hydrofluoric, or oxalic acid, or the lactic acid may be added first to the acid to be used for decomposition and the dry lactate then stirred with this mixture, after which the lactic acid is separated in any suitable manner.

The following is an example of how the process may be carried out in detail: 200 liters of a solution of lactate of lime coming from the fermenting process and having a strength of 10° Baumé are boiled down to 50 liters and in this state or after purification by a suitable process for example, by decolorizing the lactate solution by a suitable agent, such as animal charcoal, and filtration, 50 kilograms of a 50 per cent. lactic acid are added. Decomposition is then effected by means of sulfuric acid, and the lactic acid separated from the calcium sulfate in any suitable way. The lactic acid thus obtained has also a concentration of 50 per cent.

What I claim as my invention and desire to secure by Letters Patent is:

1. The process of manufacturing lactic acid from solutions containing lactate of lime which consists in concentrating these solutions, precipitating the lime of the concentrated lactate by an acid in the presence of added concentrated free lactic acid and separating the lactic acid.

2. The process of manufacturing lactic acid from solutions containing lactate of lime which consists in concentrating these solutions by evaporating to dryness, precipitating the lime of the concentrated lactate by an acid in the presence of added concentrated free lactic acid and separating the lactic acid.

3. The process of manufacturing lactic acid from solutions containing lactate of lime which consists in concentrating these solutions, precipitating the lime of the concentrated lactate by an acid mixture which contains concentrated free lactic acid and separating the lactic acid.

In testimony whereof I have hereunto set my hand in presence of two subscribing witnesses.

WILHELM KLAPPROTH.

Witnesses:
JEAN GRUND,
CARL GRUND.